United States Patent
Dage et al.

(10) Patent No.: US 8,249,749 B2
(45) Date of Patent: Aug. 21, 2012

(54) CLIMATE CONTROL SYSTEM AND METHOD FOR OPTIMIZING ENERGY CONSUMPTION OF A VEHICLE

(75) Inventors: Gerhard A. Dage, Franklin, MI (US); Halim Wijaya, Canton, MI (US); Christopher Mark Greiner, Birmingham, MI (US); Wayne Frank Buescher, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 306 days.

(21) Appl. No.: 12/575,219

(22) Filed: Oct. 7, 2009

(65) Prior Publication Data
US 2011/0082594 A1    Apr. 7, 2011

(51) Int. Cl.
G05D 23/00 (2006.01)
(52) U.S. Cl. .......... 700/276; 700/300; 62/228.1
(58) Field of Classification Search .......... 700/276, 700/299, 300; 62/228.1
See application file for complete search history.

(56) References Cited

U.S. PATENT DOCUMENTS

| 5,275,012 | A | 1/1994 | Dage et al. |
| 6,173,902 | B1* | 1/2001 | Bauer et al. ........ 236/49.3 |
| 6,209,331 | B1* | 4/2001 | Lake et al. ........ 62/180 |
| 6,367,272 | B1 | 4/2002 | Zeng et al. |
| 6,381,971 | B2 | 5/2002 | Honda |
| 6,668,917 | B1 | 12/2003 | Zeng |
| 6,675,592 | B2 | 1/2004 | Huang et al. |
| 6,675,597 | B2 | 1/2004 | Ieda et al. |
| 7,032,393 | B2 | 4/2006 | Tamai et al. |
| 2004/0168449 | A1 | 9/2004 | Homan et al. |
| 2004/0206102 | A1 | 10/2004 | Homan et al. |
| 2010/0019050 | A1* | 1/2010 | Han et al. ........ 236/44 C |

* cited by examiner

*Primary Examiner* — Ryan Jarrett
(74) *Attorney, Agent, or Firm* — David B. Kelley; Brooks Kushman P.C.

(57) ABSTRACT

A climate control system includes a control head having a warmer/cooler temperature control for providing relative thermal comfort. A thermal comfort rating (TCR) corresponding to a range of passenger cabin temperatures is determined based upon a comfort level selection by an occupant using the control head. A control strategy employs look-up tables corresponding to the TCR to determine the speed of an electric compressor and the position of a temperature control blend door. The strategy provides for a relatively fast ramp down to a minimum compressor speed to improve fuel economy while maintaining a relative level of thermal comfort.

18 Claims, 7 Drawing Sheets

Thermal Comfort Rating (TCR) = 5

| Passenger Cabin Temp (F) | Ambient Temp | | | | | |
|---|---|---|---|---|---|---|
| | Compressor (RPM) | | | Blend Door Position (%) | | |
| | 30 F | 75 F | 90 F | 30 F | 75 F | 90 F |
| 110 | 4000 | 4500 | 5000 | 0 | 0 | 0 |
| 100 | 2000 | 3500 | 4000 | 0 | 0 | 0 |
| 90 | 500 | 2000 | 3000 | 10 | 0 | 0 |
| 80 | 0 | 1200 | 2000 | 30 | 10 | 0 |
| 70 | 0 | 500 | 1500 | 60 | 30 | 0 |
| 60 | 0 | 500 | 1000 | 90 | 50 | 10 |
| 50 | 0 | 0 | 500 | 100 | 80 | 50 |
| 40 | 0 | 0 | 0 | 100 | 100 | 70 |
| 30 | 0 | 0 | 0 | 100 | 100 | 100 |
| 20 | 0 | 0 | 0 | 100 | 100 | 100 |
| 10 | 0 | 0 | 0 | 100 | 100 | 100 |
| 0 | 0 | 0 | 0 | 100 | 100 | 100 |

Thermal Comfort Rating (TCR) = 6

80'

| Passenger Cabin Temp (F) | Ambient Temp | | | | | |
|---|---|---|---|---|---|---|
| | Compressor (RPM) | | | Blend Door Position (%) | | |
| | 30 F | 75 F | 90 F | 30 F | 75 F | 90 F |
| 110 | 4000 | 4500 | 5000 | 0 | 0 | 0 |
| 100 | 1500 | 2500 | 3500 | 0 | 0 | 0 |
| 90 | 0 | 1000 | 2000 | 0 | 0 | 0 |
| 80 | 0 | 500 | 1000 | 10 | 0 | 0 |
| 70 | 0 | 0 | 500 | 40 | 10 | 0 |
| 60 | 0 | 0 | 0 | 80 | 40 | 10 |
| 50 | 0 | 0 | 0 | 100 | 80 | 50 |
| 40 | 0 | 0 | 0 | 100 | 100 | 70 |
| 30 | 0 | 0 | 0 | 100 | 100 | 100 |
| 20 | 0 | 0 | 0 | 100 | 100 | 100 |
| 10 | 0 | 0 | 0 | 100 | 100 | 100 |
| 0 | 0 | 0 | 0 | 100 | 100 | 100 |

Thermal Comfort Rating (TCR) = 7

| Passenger Cabin Temp (F) | Ambient Temp | | | | | |
|---|---|---|---|---|---|---|
| | Compressor (RPM) | | | Blend Door Position (%) | | |
| | 30 F | 75 F | 90 F | 30 F | 75 F | 90 F |
| 110 | 4000 | 4500 | 5000 | 0 | 0 | 0 |
| 100 | 1000 | 2000 | 3000 | 0 | 0 | 0 |
| 90 | 0 | 500 | 1500 | 0 | 0 | 0 |
| 80 | 0 | 0 | 500 | 10 | 0 | 0 |
| 70 | 0 | 0 | 0 | 40 | 10 | 0 |
| 60 | 0 | 0 | 0 | 80 | 40 | 10 |
| 50 | 0 | 0 | 0 | 100 | 80 | 50 |
| 40 | 0 | 0 | 0 | 100 | 100 | 70 |
| 30 | 0 | 0 | 0 | 100 | 100 | 100 |
| 20 | 0 | 0 | 0 | 100 | 100 | 100 |
| 10 | 0 | 0 | 0 | 100 | 100 | 100 |
| 0 | 0 | 0 | 0 | 100 | 100 | 100 |

CLIMATE CONTROL SYSTEM AND METHOD FOR OPTIMIZING ENERGY CONSUMPTION OF A VEHICLE

BACKGROUND

1. Technical Field

The present invention relates to a climate control system and method, and more particularly a climate control strategy utilizing vehicle occupant comfort level settings to optimize fuel economy.

2. Background Art

Automatic climate control is increasingly prevalent in vehicles today. In some vehicles, a driver merely chooses a temperature setting through a climate control head unit, and a control system operates a climate control system to achieve the desired temperature. The climate control system may control the functions of a fan—e.g., on/off and fan speed— and an air conditioning (A/C) system. Such a climate control system may also control the position and movement of various air dampers, or air flow doors, to control movement of air through an evaporator core or a heater core, the recirculation of air through the vehicle, the intake of fresh air, or some combination thereof.

Conventional automatic temperature control allows users to set extreme temperature set points often resulting in significant fuel economy penalties. For example, an occupant may set the automatic temperature control at the extreme low setting in warm ambient conditions while simultaneously opening vehicle windows. In doing so, the air conditioning system uses an air conditioning compressor and a condenser to effectuate cooling of a passenger cabin of the vehicle. However, operation of the air conditioning compressor uses a relatively large amount of energy. Meanwhile, some of the cooling capacities of the A/C system are lost when the windows are open.

The lower the automatic temperature setting, the harder the compressor and a heating, venting and air conditioning (HVAC) blower must work to attain the extreme setting. In the case of a hybrid electric vehicle (HEV), operation of an electric compressor often necessitates starting the engine to ensure that the battery is not over-discharged. One of the benefits of an HEV is the fuel savings achieved by driving the vehicle using electric motor power, while maximizing the time the engine is shut down. Thus, inefficient operation of the climate control system can offset some of the benefits gained by driving an HEV.

Accordingly, a need exists for a system and method for vehicle climate control that strikes a balance between meeting the comfort requirements of vehicle occupants and minimizing the overall power consumed by the climate control system.

BRIEF DESCRIPTION OF THE DRAWINGS

FIG. 5b is a simplified, exemplary graph corresponding to the look-up table in FIG. 5a;

FIG. 6b is a simplified, exemplary graph corresponding to the look-up table in FIG. 6a;

FIG. 7b is a simplified, exemplary graph corresponding to the look-up table in FIG. 7a.

DETAILED DESCRIPTION

Figure 1:
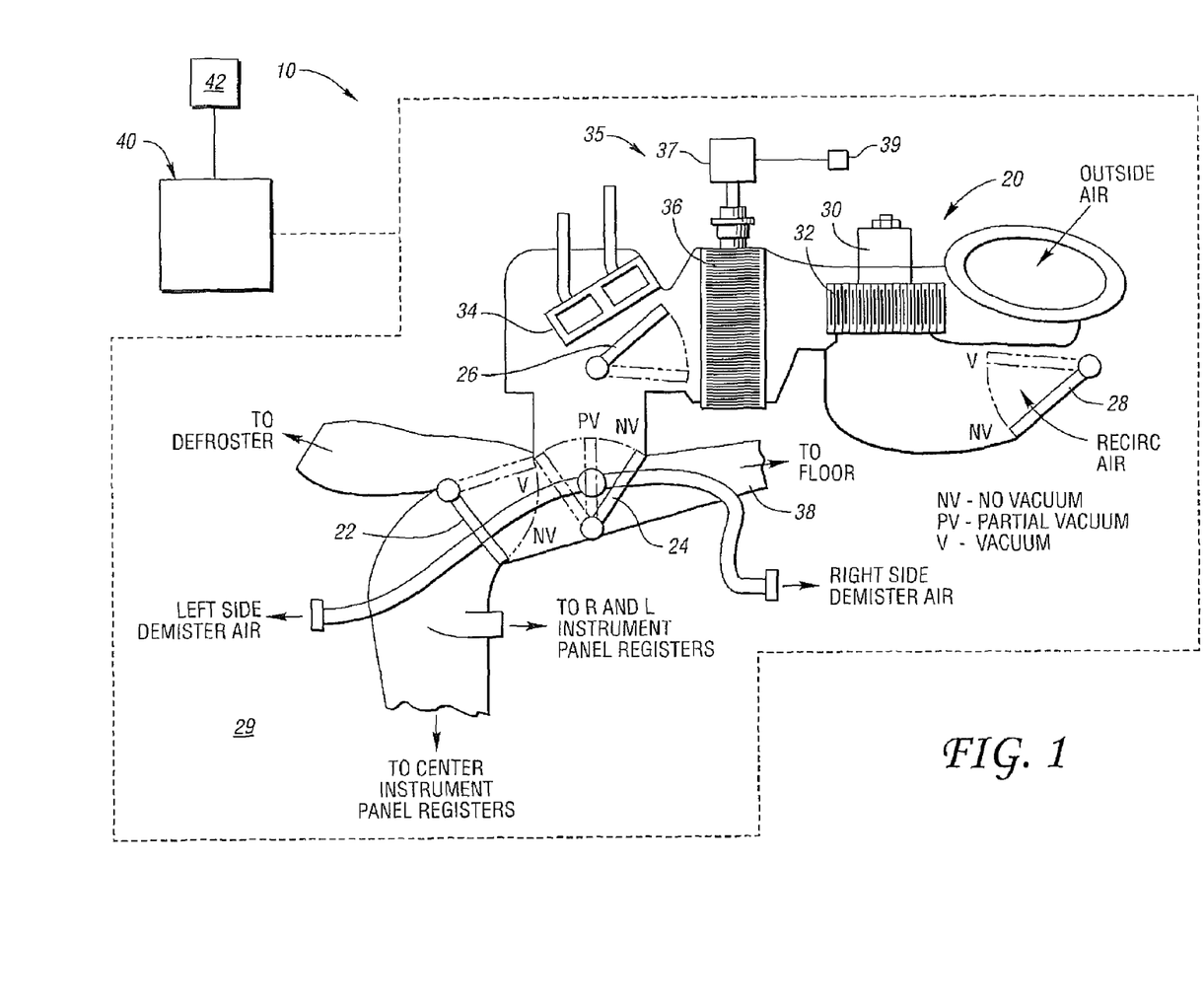
FIG. 1 is a simplified, exemplary schematic diagram illustrating a system for environmental management of a vehicle in accordance with an embodiment of the present application.

In general, control of cabin temperature, as well as temperature and defogging of a windshield, within an automobile is accomplished using various actuators to adjust the temperature and flow of air supplied to the cabin of the vehicle. FIG. 1 schematically shows an exemplary climate control system 10 for environmental management of a vehicle in accordance with an embodiment of the present application. The vehicle may include a heating, ventilating and air conditioning (HVAC) system, generally indicated at 20. The HVAC system 20 can include the arrangement of airflow doors, including panel-defrost, floor-panel, and outside recirculated air actuators or doors 22, 24, and 28, respectively.

The doors may be part of an air distribution system for directing the flow of conditioned air to various locations within a passenger cabin 29 of the vehicle, such as to the windshield, floor, or instrument panel as is commonly known. The doors 22, 24 and 28 may be driven by vacuum motors (not shown) between their various vacuum, partial vacuum and no vacuum positions in a conventional fashion as indicated in FIG. 1, or may be driven by an electric servo motor. A temperature control blend door 26 may also provided, and may be driven by an electric servo motor (not shown). The temperature control blend door 26 provides for hot air mixing done to obtain a desired target discharge air temperature, which reflects the temperature of air as it exits the HVAC system 20 into the passenger cabin 29.

The HVAC system 20 may also include a variable speed fan system (also referred to herein as an HVAC blower) 30 including a blower wheel 32 for generating airflow. The HVAC system 20 may further include a heating system, shown in FIG. 1 as a heater core 34, and an air conditioning (A/C) system 35, including an evaporator core 36 and a compressor 37. The compressor 37 may be an electric compressor rather than one that is mechanically driven by an engine. This can provide greater control of the operation of the HVAC system 20, in that electric compressors can be configured for variable speed operation, unlike their mechanical counterparts whose speed is inextricably linked with the speed of the engine. The air conditioning system 35 may include other various components known to one of ordinary skill in the art.

The heater core 34 and the evaporator core 36 respectively heat and cool the airflow generated by the fan system 30. The generated airflow may be distributed through an airflow distribution system and associated ducting 38. The HVAC system 20 may control the temperature, the direction of the airflow, and the ratio of fresh air to recirculated air. The HVAC system 20 may further include a low-pressure cycle switch 39 that communicates with the compressor 37. The low-pressure switch 39 may be operable to deactivate the compressor 37 under certain conditions. In addition, the compressor 37 can be deactivated when the evaporator core temperature drops below a predetermined value; this helps to prevent freezing of the evaporator core 36.

Operation of the HVAC system 20 may be controlled by an electronic controller 40. The controller 40 can generate signals to control the HVAC system 20 according to a variety of inputs. Moreover, the controller 40 may receive inputs from a number of climate control devices, such as sensors, other control modules, or the like. In addition to receiving inputs from various climate control devices, the controller 40 may also receive inputs from a vehicle occupant via an input device, which may be a climate control head 42 as illustrated in FIG. 3.

Figure 2:
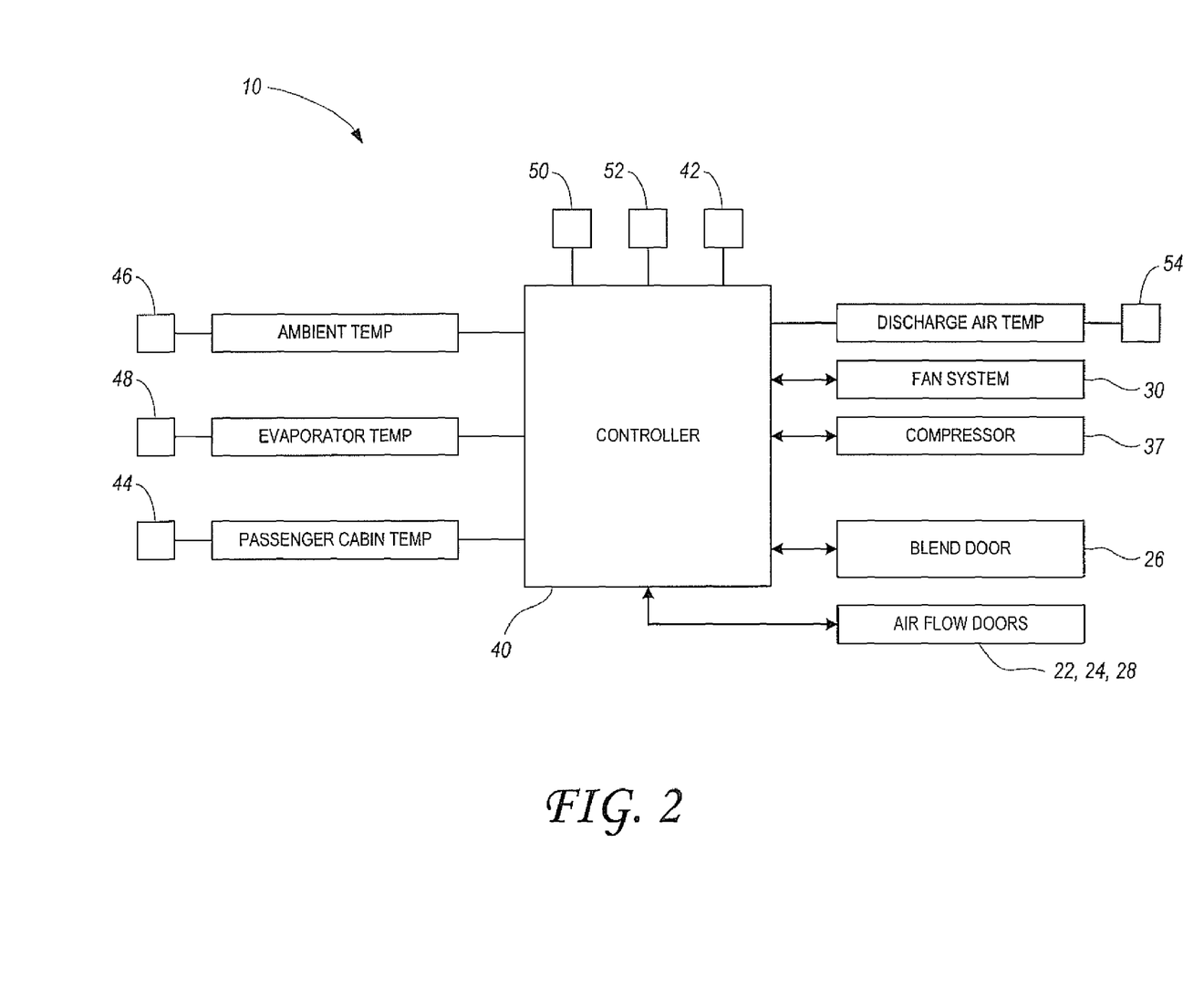
FIG. 2 is a simplified, exemplary block diagram illustrating a system for environmental management of a vehicle in accordance with an embodiment of the present application.

FIG. 2 depicts a simplified, exemplary block diagram of the climate control system 10, including the controller 40. As mentioned above, the controller 40 may receive inputs from a number of climate control devices, as well as other devices or modules. As an example, the controller 40 may receive inputs from a passenger cabin temperature sensor 44, an ambient temperature sensor 46, an evaporator temperature sensor 48, a humidity sensor 50, a solar load sensor 52, and a discharge air temperature sensor 54. The sensors 44-54 may respectively provide signals that are representative of interior cabin temperature, ambient (outside) air temperature, evaporator temperature, relative humidity of the passenger cabin, solar energy including direction and angle of sunlight entering the vehicle, and discharge air temperature (i.e., the temperature of the air being discharged from the HVAC system 20 into the vehicle cabin).

The controller 44 may also receive input from the control head 42 corresponding to various occupant choices regarding the climate of the passenger cabin 29. As explained more fully below, the control head 42 may allow a vehicle occupant to set a relative comfort level, and the HVAC system 20 may operate automatically to achieve and maintain the occupant set comfort level. Further, the control head 42 may allow a vehicle occupant to manually control the HVAC functions, and in some cases, override an automatic operation of the HVAC system 20. The controller 40 may control operation of the compressor 37 and the fan system 30, as well as the doors 22-28 to regulate the temperature and flow of air, and ultimately to maintain the comfort of driver and passengers in the vehicle. In addition, the controller 40 may be programmed with an algorithm to effect automatic defogging of the vehicle windshield.

Figure 3:
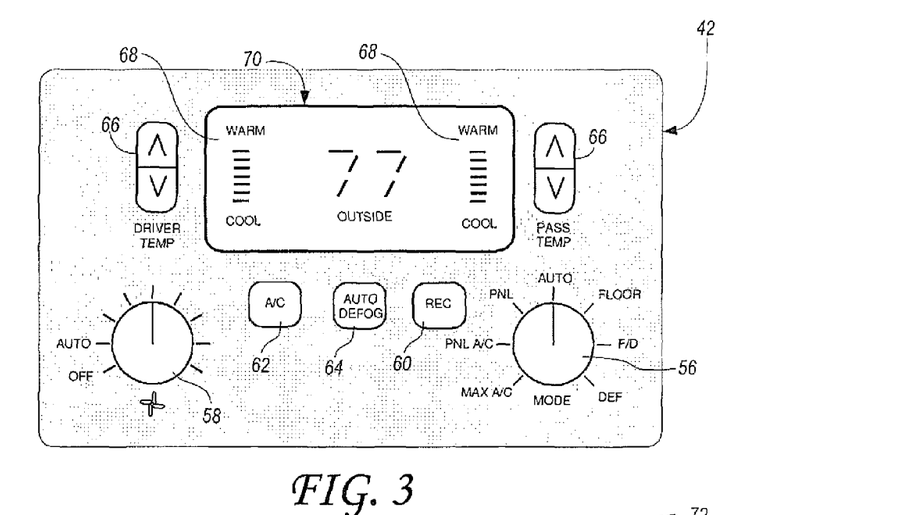
FIG. 3 is a simplified, exemplary front plan view of a climate control head in accordance with an embodiment of the present application.

FIG. 3 illustrates an exemplary climate control head 42 in greater detail. The control head 42 can act as an input device for vehicle occupants, allowing manual selection of various climate control functions. A mode selector switch 56 can allow an occupant to manually choose where airflow will be directed. The mode selector switch 56 may also allow the occupant to select an automatic mode, which allows the climate control system 10 to regulate passenger comfort as well as control various climate control functions automatically based upon environmental conditions and/or vehicle operating characteristics. The control head 42 may further include a fan selector switch 58 for providing on-off, manual and automatic fan speed control. A recirculation switch 60 can allow for full recirculation of cabin air, all fresh air, or some combination thereof.

The climate control head 42 may also include an A/C switch 62 that allows an occupant to manually select air conditioning. Moreover, an automatic defogging switch 64 may also be provided. Some automatic climate control systems monitor a temperature and humidity level of the vehicle cabin to determine if a defogging operation of the windshield is desirable. When it is determined that an automatic defogging operation is desired, the air conditioning system is typically operated to provide a supply of relatively dry air to the windshield to quickly effect the defogging operation.

The control head 42, including the features described above, is just one example of a climate control head that can be used in accordance with embodiments of the present application. Other control heads, including other analog or digital control heads may also be used, and may include alternate or additional features other than the ones described herein without departing from the scope of the present application.

According to a particular embodiment of the present application, the climate control head 42 may include one or more occupant comfort level selectors 66, which can provide relative comfort control of the passenger cabin 29 in both the manual and automatic modes. The comfort level selector 66 may be provided in place of an automatic temperature control (ATC) switch. An occupant may select a relative comfort level setting rather than a specific temperature set point. For example, rather than specifying a desired cabin temperature, an occupant may opt for warmer/cooler climate control. In this regard, a range of comfort level settings, described in greater detail in FIG. 4, may be offered to provide for more efficient climate control.

The comfort level selectors 66 may include a driver comfort level selector and a passenger comfort level selector for dual-zone climate control. Each comfort level selector 66 may be used by an occupant to select a relative comfort level of the cabin 29 in increments, which can be displayed by a corresponding comfort level indicator 68 using a display panel 70. The climate control system 10 may then operate to achieve and maintain the occupant set comfort level automatically. The comfort level indicator 68 may display a number of relative comfort levels ranging from, for example, cool to warm or cold to hot. The display panel 70 may display additional content such as current cabin temperature, current outside ambient temperature, or the like.

Figure 4:
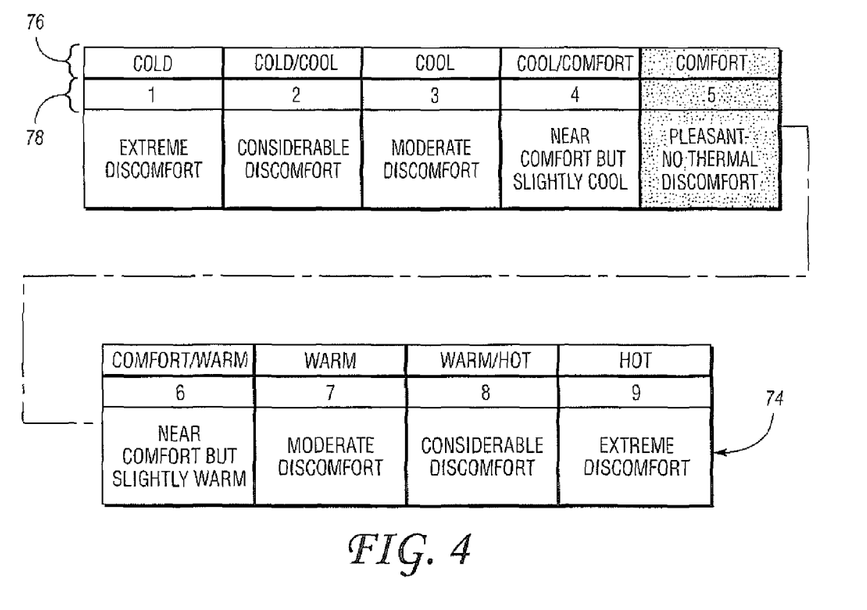
FIG. 4 is a simplified, exemplary table illustrating a climate control comfort setting scale in accordance with an embodiment of the present application.

Turning now to FIG. 4, a simplified, exemplary table 72 depicting a thermal comfort scale 74 that may be employed by the system 10 according to an embodiment of the present application is shown. As seen therein, a spectrum of relative thermal comfort ranging from "cold" at one end to "hot" at the other end is provided for illustrative purposes. Adjusting the desired relative thermal comfort level using the comfort level selector 66 influences where the comfort level selection falls on the thermal comfort scale 74. For example, adjusting the comfort level selector 66 for a cooler cabin climate shifts the comfort level selection to the left on the scale 74.

As illustrated in FIG. 4, the comfort scale 74 may be divided into several comfort classes 76—each class assigned its own thermal comfort rating (TCR) 78. It should be noted that greater or fewer TCRs may be provided without departing from the scope of the present application. For instance, the ends of the applicable spectrum of thermal comforts provided in scale 74 may be "cool" and "warm," rather than "cold" and "hot." Moreover, an incremental change in the comfort level selection by an occupant does not necessarily correspond to the same incremental change in TCR. Further, other conditions may be factored in when determining the TCR in addition to the comfort level selection of an occupant using the comfort level selector 66. For example, environmental conditions such as solar load and humidity may influence the way in which the TCR is determined. Although FIG. 4 shows a specific comfort level (e.g., "cool," "comfort," "warm") associated with its own TCR, it is merely illustrative to demonstrate how incremental changes in the comfort level selection may affect the TCR. In general, selecting a warmer comfort level setting on the control head 42 may have a tendency to increase the TCR.

Since the climate control head 42 provides for selection of relative thermal comfort, rather than specific temperature values, it should be appreciated that a particular TCR may correspond to a range of temperatures. As an example, a TCR of 5, described as "pleasant—no thermal discomfort," may perhaps correspond to temperatures ranging from 68° F. to 73° F. In this regard, a TCR of 4 may correspond to a range of temperatures below that of TCR 5, while a TCR of 6 may correspond to a range of temperatures above that of TCR 5. Particular TCR temperature ranges may vary based upon various design requirements, preferences and/or other system parameters without departing from the scope of the present application.

As shown, TCR 5 may fall near the middle of the spectrum of relative thermal comfort. This is because it may correspond to the optimum level of thermal comfort within a range that incorporates both cold and hot temperature extremes. As articulated above, the thermal comfort ratings generally correspond to relative thermal comfort inside the passenger cabin 29. Thus, it should be appreciated that although the ends of the comfort spectrum in scale 74 are described in terms of discomfort, some level of general comfort may be maintained.

In warmer ambient temperatures, the A/C system may be employed to cool the cabin 29 and thereby increase thermal comfort. The warmer the ambient air is, the harder the A/C system must work to both attain and maintain a desired level of thermal comfort. Likewise, the cooler the comfort level selection by an occupant, the harder the A/C system must work. Accordingly, the control head 42 may provide for some level of automatic temperature control in a general sense for extreme ambient and passenger cabin temperatures, and for an extreme occupant set point adjustment, during the A/C pull down. Even though some level of general comfort may be maintained, the settings on the control head 42 may not be numbered as with conventional automatic temperature control. Accordingly, there is no implication from the control head 42 that the climate control system 10 automatically maintains a specific temperature. By providing relative thermal comfort levels instead, fuel economy performance may be increased without competing with inefficient automatic temperature control.

Since each TCR may correspond to a range of temperatures, various climate control system devices (such as the HVAC blower 30, electric compressor 37, heater core 34, or the like) may be less inclined consume additional energy once the passenger cabin temperature reaches the corresponding comfort range. To this end, when the air conditioning system 35 is operating, the system 10 may be reluctant to increase the compressor speed in order to regain comfort, which can assist in improving or maintaining fuel economy. For example, if the sun load increases, the occupant may lose some comfort, but fuel economy will generally be maintained. If the cabin 29 becomes too warm and the occupant wishes to be more comfortable, the occupant may have to manually adjust the comfort level selector 66 to a cooler relative comfort level and knowingly sacrifice fuel economy.

In the A/C mode, the system 10 adjusts the climate by controlling the compressor speed and temperature blend door position. The blend door position can determine the amount of hot-air mixing that occurs in the HVAC system. If the blend door is fully opened, then the maximum amount of hot-air mixing occurs as it is discharged into the passenger cabin. Moreover, the faster the compressor operates, the more cooling power is generated. The system 10 may provide a generally linear climate control strategy based at least upon the ambient temperature, the cabin temperature, and the TCR. As previously mentioned, the TCR may be determined at least in part upon the comfort level selection by an occupant. The climate control system may utilize a plurality of look-up tables (LUTs) in executing the strategy. In this regard, the controller may store a LUT for each TCR. The compressor speed and blend door position output may be determined from the applicable LUT as a function of the ambient temperature and the cabin temperature.

Figure 5A:
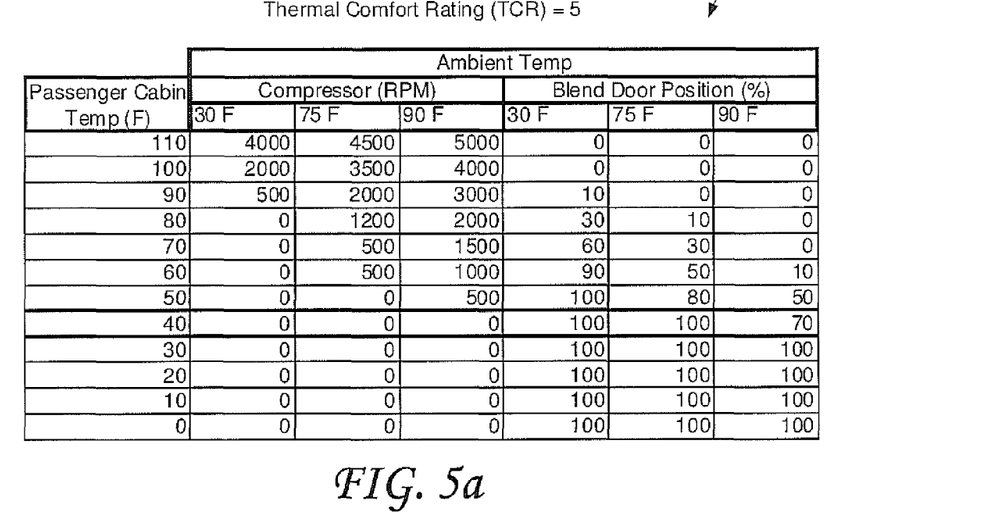
FIG. 5a is a simplified, exemplary look-up table in accordance with an embodiment of the present application.
Figure 6A:
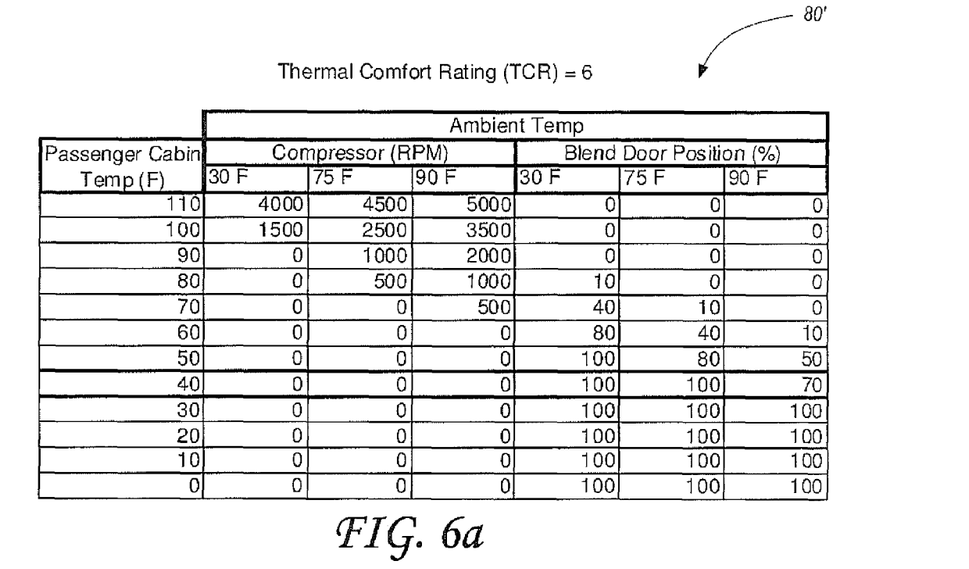
FIG. 6a is another simplified, exemplary look-up table in accordance with an embodiment of the present application.
Figure 7A:
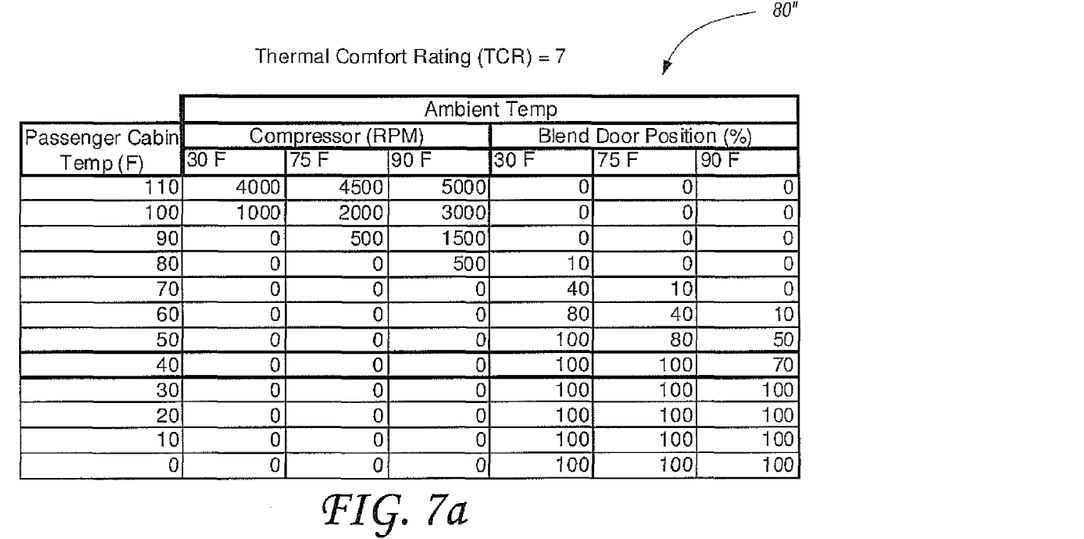
FIG. 7a is yet another simplified, exemplary look-up table in accordance with an embodiment of the present application.

FIGS. 5a, 6a and 7a depict a simplified, exemplary LUT 80 for TCRs equal to 5, 6 and 7, respectively. Values associated with the passenger cabin temperature input are shown in the left-most column, while values associated with the ambient temperature input are provided across the top. The LUTs shown in FIGS. 5a, 6a and 7a are for illustrative purposes only and, thus, are merely representative of the type of information contained therein, but not necessarily the quantity or resolution of such information. For example, many more cabin temperature values and ambient temperature values may be mapped to a typical LUT for determining compressor speed and blend door position outputs. As shown, compressor speed may be provided in revolutions per minute (RPM) and blend door position may be provided as a percentage, in which 100% corresponds to the blend door being open to its maximum.

The specific values mapped to the LUTs are also exemplary and may vary depending on a number of design considerations and constraints. For example, FIGS. 5a, 6a and 7a each show that the compressor may turn on when the ambient temperature is 30° F. Although this is unlikely, and may even be prohibited, it is done to more clearly show lines 94, 94' and 94" in FIGS. 5b, 6b and 7b, respectively, as will be described in greater detail below. Similarly, it unlikely that the passenger cabin temperature would reach values of 110° F. when the ambient temperature is 30° F., but such values exist in the LUTs to demonstrate the type and quantity of information that may be contained therein.

Figure 5B:
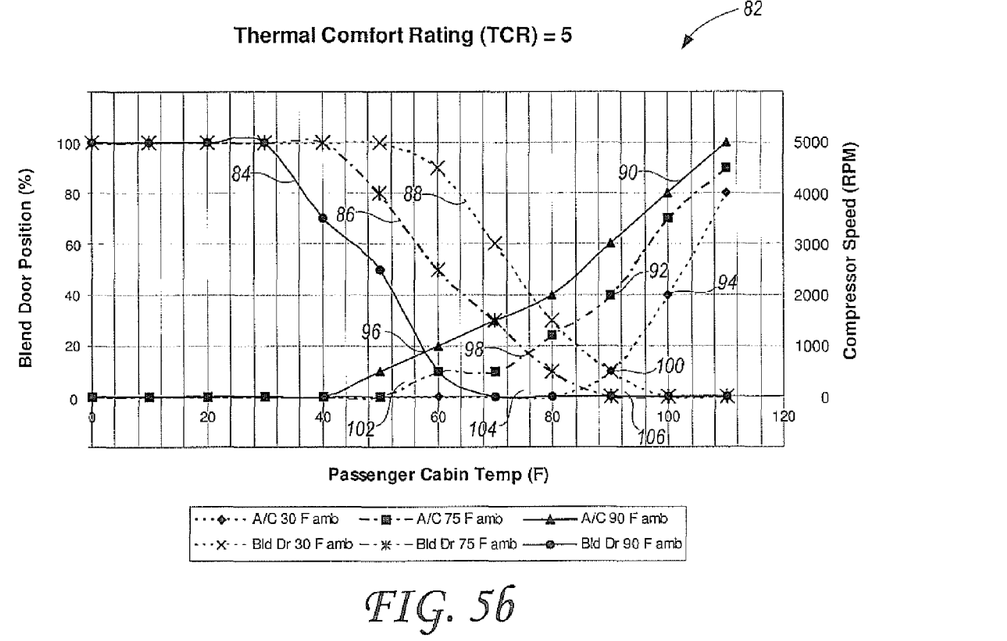
Figure 6B:
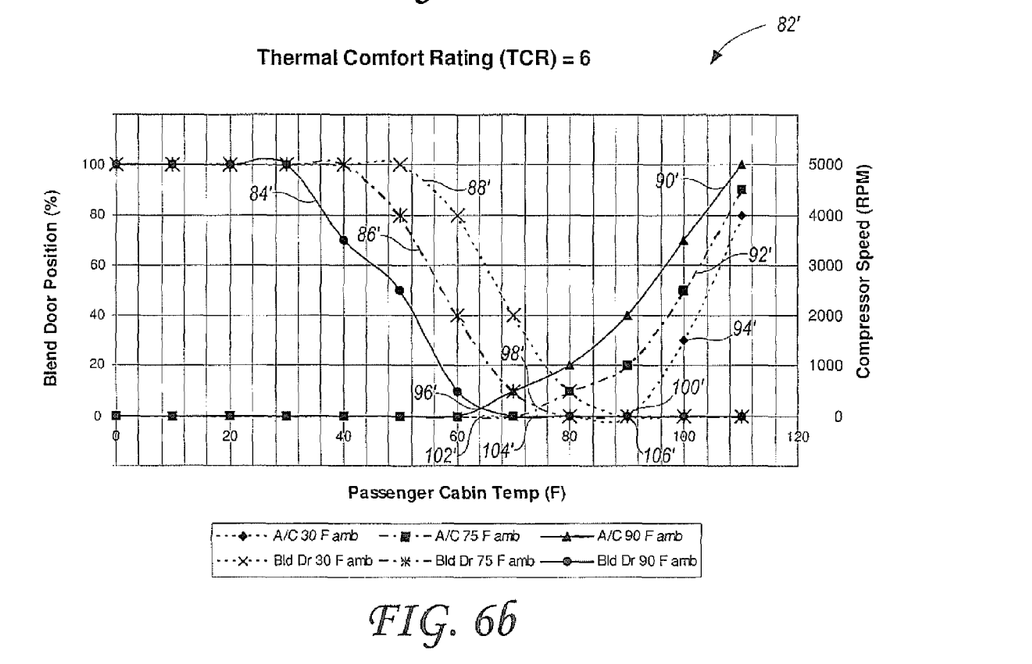
Figure 7B:
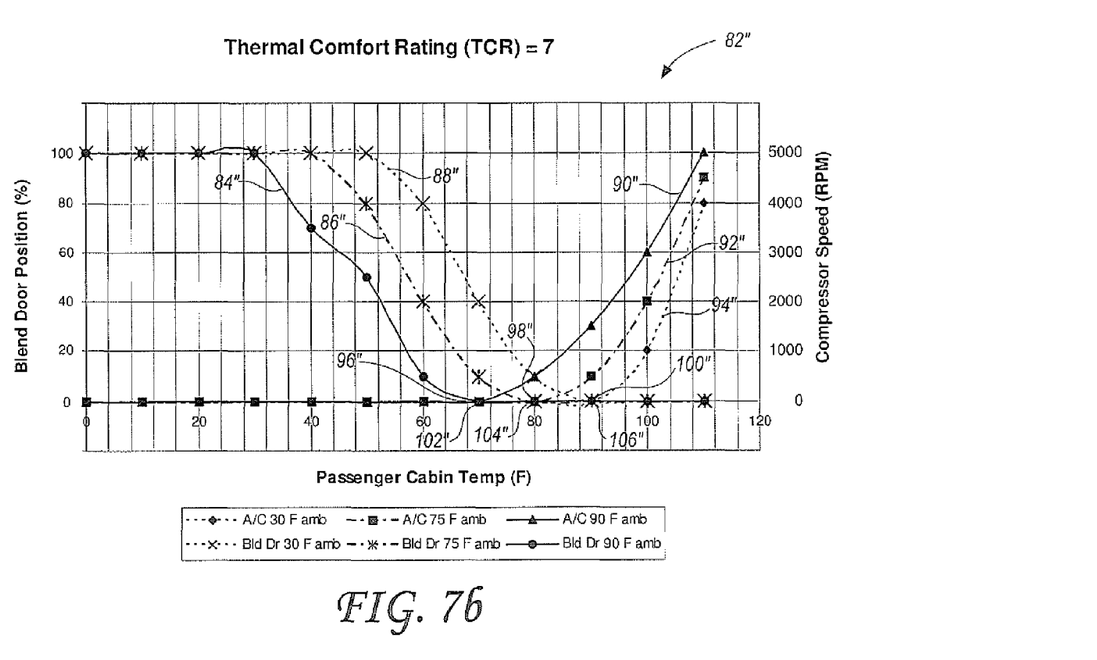

FIGS. 5b, 6b and 7b are graphical plots 82 corresponding to the LUTs 80 in FIGS. 5a, 6a and 7a, respectively. Each illustrates the compressor speed and blend door position outputs as a function of cabin temperature and ambient temperature for a given TCR.

FIG. 5b, corresponding to a TCR equal to 5, may be representative of ideal passenger comfort. Line 84 depicts the blend door position as a function of the cabin temperature when the ambient temperature is approximately 90° F. Line 86 depicts the blend door position as a function of the cabin temperature when the ambient temperature is approximately 75° F. Line 88 depicts the blend door position as a function of the cabin temperature when the ambient temperature is approximately 30° F. Correspondingly, line 90 depicts the compressor speed as a function of cabin temperature when the ambient temperature is approximately 90° F. Line 92 depicts the compressor speed as a function of cabin temperature when the ambient temperature is approximately 75° F. Line 94 depicts the compressor speed as a function of cabin temperature when the ambient temperature is approximately 30° F. Lines 84 and 90, corresponding to 90° F. ambient, intersect at point 96. Lines 86 and 92, corresponding to 75° F. ambient, intersect at point 98. Lines 88 and 94, corresponding to 30° F. ambient, intersect at point 100. The areas 102, 104, 106 below the intersection points 96, 98, 100, respectively, may be indicative of some energy inefficiencies of the climate control system when functioning to optimize comfort.

FIG. 6b corresponds to a TCR equal to 6, in which the occupant may sacrifice a little comfort to improve fuel economy. It should be noted that TCR 6 may still be very comfortable to many drivers, just slightly warmer than TCR 5. As shown, the areas 102', 104', 106' below the intersection points 96', 98', 100', respectively, are much less when TCR is equal to 6. The indication may be that the system is operating more efficiently, resulting in improved fuel economy.

FIG. 7b corresponds to a TCR equal to 7, in which the occupant may experience some moderate discomfort. Again, though described in terms of moderate discomfort, some general level of comfort may be maintained. The areas 102", 104", 106" below the intersection points 96", 98", 100", respectively, are even smaller when TCR is equal to 7. Thus, it can be seen that as the relative level of comfort is decreased, the climate control system can operate more efficiently.

Once the passenger cabin temperature falls within the range of temperatures corresponding to the determined TCR, the system 10 may maintain the compressor 37 at its current speed and the blend door 26 in its current position. As previously described, the system 10 may then be reluctant to increase compressor speed should the cabin temperature climb. This is because the strategy employed by the climate control system 10 of the present application is designed to improve fuel economy while maintaining occupant comfort, rather than trying to maintain a specific set temperature. In doing so, the climate control strategy of the present application may employ a relatively fast ramp down to a minimum compressor speed. Once in the target comfort range, the compressor 37 is less inclined to consume additional energy than that in a system trying to guarantee steady-state control of a set temperature.

Figure 8:
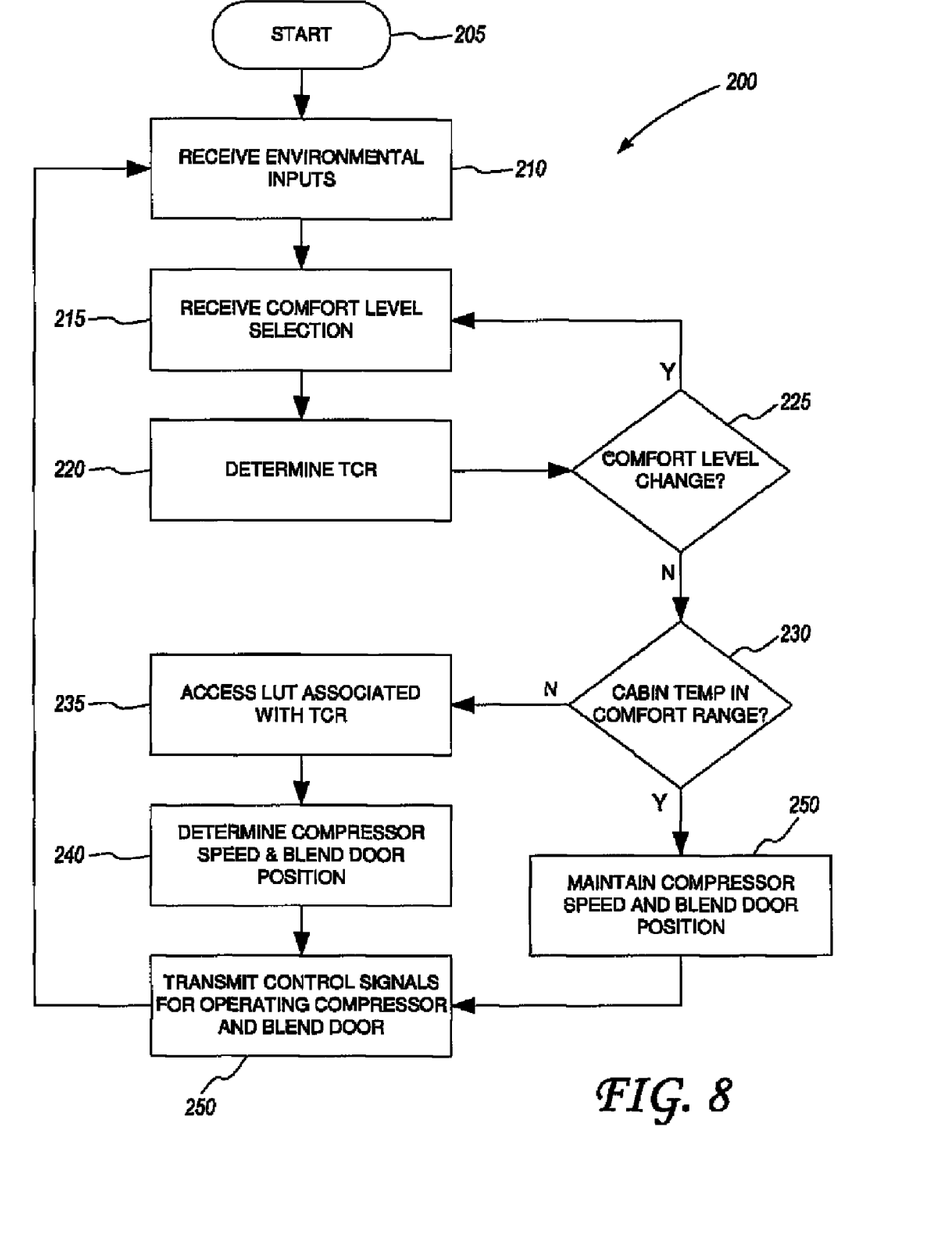
FIG. 8 is a simplified, exemplary flowchart illustrating a method for environmental management of a vehicle in accordance with an embodiment of the present application.

Referring now to FIG. 8, a simplified, exemplary flow diagram of a method 200 for operating a climate control system is illustrated. Step 205 provides an entry to the method. At step 210, the system may receive inputs relating to current environmental conditions. For example, the controller 40 may receive input corresponding to the outside ambient temperature from the ambient temperature sensor 46 and input corresponding to the passenger cabin temperature from the cabin temperature sensor 44. Moreover, the controller may receive several additional inputs such as humidity and solar load. Next, the system may receive operator input via the climate control head 42. In particular, an occupant may select a desired relative thermal comfort level using the comfort level selector 66. Correspondingly, the controller 40 may receive the comfort level selection from the control head at step 215. Once the comfort level selection is obtained, the system may determine a thermal comfort rating (TCR), as provided at step 220. As previously described, the TCR may be indicative of the target comfort level defined in the comfort scale 74. The TCR may be based primarily upon the comfort level selection. In addition, the TCR may be further based upon humidity and solar load.

Once the TCR is initially determined, the system may continuously monitor for changes in the comfort level selection at step 225. If an occupant has adjusted the comfort level, the method may return to 215 so that the new comfort level selection may be received by the controller 40. However, if the comfort setting has not been adjusted, the method continues to step 230. At step 230, the system may determine whether the current cabin temperature is within the range of temperatures associated with the determined TCR. If the current cabin temperature is not within the comfort range, the method may proceed to step 235 wherein the system accesses one of a plurality of look-up tables. The plurality of look-up tables may be stored within memory internal or external to the controller 40. A look-up table may be provided for each TCR. At step 235, the system accesses the look-up table corresponding to the TCR determined at step 220. At step 240, the system can determine the compressor speed (or target evaporator temperature) and the blend door position, using the accessed look-up table, based upon the cabin temperature and the ambient temperature obtained at step 210. Once the compressor speed and blend door position are determined, representative electrical signals are transmitted to the compressor 37 and the blend door 26 so that they operate accordingly, at step 245. The method may then loop back to step 210.

Returning to step 230, if on the other hand the current cabin temperature is within the comfort range, the method may proceed to step 250. At step 250, the system may maintain the compressor speed and the blend door position at their current values. So long as the cabin temperature is within the comfort range, compressor speed and blend door position may remain unchanged. In that regard, the method may again proceed to step 245 in which signals representative of the current compressor speed and blend door position continue to be transmitted to the compressor 37 and blend door 26, respectively, so that operate at the same level.

While the best mode for carrying out the invention has been described in detail, those familiar with the art to which this invention relates will recognize various alternative designs and embodiments for practicing the invention as defined by the following claims.

What is claimed:

1. A automatic climate control system comprising:
a compressor;
a blend door;
at least one relative temperature selector; and
a controller coupled to the relative temperature selector and configured to:
receive input from an ambient temperature sensor, a cabin temperature sensor, and the relative temperature selector corresponding to a relative cabin temperature change request; and
output compressor speed and blend door position based on ambient temperature, cabin temperature, and the relative cabin temperature change request.

2. The system of claim 1, wherein the controller is further configured to receive a thermal comfort rating (TCR) based at least in part upon the relative cabin temperature change request.

3. The system of claim 2, wherein the controller outputs the compressor speed and blend door position according to the ambient temperature, the cabin temperature, and the TCR.

4. The system of claim 3, wherein the controller is further configured to store a plurality of look-up tables, each corresponding to a different TCR, and access one of the plurality of look-up tables corresponding to the received TCR.

5. The system of claim 4, wherein the compressor speed and blend door position is output by the controller according to the accessed look-up table as a function of the ambient temperature and the cabin temperature.

6. The system of claim 4, wherein each TCR is associated with a range of cabin temperatures.

7. The system of claim 6, wherein current compressor speed and blend door position are maintained when the cabin temperature is within the range associated with the TCR.

8. The system of claim 2, wherein the TCR is further based upon solar load and humidity.

9. A method for operating an automatic climate control system comprising:

receiving inputs corresponding to an ambient temperature, a cabin temperature, and a relative cabin temperature change request; and outputting compressor speed and blend door position based upon the ambient temperature, the cabin temperature, and the relative cabin temperature change request.

10. The method of claim 9, further comprising:

receiving a thermal comfort rating (TCR) based at least in part upon the relative cabin temperature request; and outputting the compressor speed and the blend door position based upon the ambient temperature, the cabin temperature, and the TCR.

11. The method of claim 10, wherein the TCR is further based upon solar load and humidity.

12. The method of claim 10, further comprising:

storing a plurality of look-up tables, each look-up table corresponding to a different TCR; and accessing one of the plurality of look-up tables corresponding to the received TCR.

13. The method of claim 12, wherein the compressor speed and blend door position outputs are selected according to the accessed look-up table as a function of the ambient temperature and the cabin temperature.

14. The method of claim 12, wherein each TCR is associated with a range of cabin temperatures.

15. The method of claim 14, further comprising:

maintaining a current compressor speed and blend door position when the cabin temperature is within the range associated with the received TCR.

16. A method for operating an automatic climate control system in a vehicle having a compressor, a blend door, and a control head having at least one relative temperature selector for use by an operator of the vehicle, the method comprising:

receiving inputs corresponding to an ambient temperature, a cabin temperature, and a relative cabin temperature change selected by the operator;

receiving a thermal comfort rating (TCR) based at least in part upon the relative cabin temperature change, wherein the TCR is associated with a range of cabin temperatures; and outputting compressor speed to the compressor and blend door position to the blend door based at least in part upon the ambient temperature, the cabin temperature, and the TCR.

17. The method of claim 16, further comprising:

storing a plurality of look-up tables, each look-up table corresponding to a different TCR; and accessing one of the plurality of look-up tables corresponding to the received TCR so that the compressor speed and blend door position are output according to the accessed look-up table as a function of the ambient temperature and the cabin temperature.

18. The method of claim 17, further comprising:

maintaining a current compressor speed and blend door position when the cabin temperature is within the range associated with the received TCR.

* * * * *